(12) United States Patent
Kang

(10) Patent No.: US 8,850,311 B2
(45) Date of Patent: Sep. 30, 2014

(54) WORD INPUT METHOD

(76) Inventor: Yun Kee Kang, Seoul (KR)

( * ) Notice: Subject to any disclaimer, the term of this patent is extended or adjusted under 35 U.S.C. 154(b) by 905 days.

(21) Appl. No.: 13/022,870

(22) Filed: Feb. 8, 2011

(65) Prior Publication Data

US 2011/0131488 A1 Jun. 2, 2011

Related U.S. Application Data

(63) Continuation of application No. PCT/KR2009/004506, filed on Aug. 12, 2009.

(51) Int. Cl.
*G06F 17/24* (2006.01)
*G06F 3/023* (2006.01)
*G06F 17/30* (2006.01)
*G06F 3/048* (2013.01)
*G06F 17/27* (2006.01)

(52) U.S. Cl.
CPC .......... *G06F 3/0237* (2013.01); *G06F 17/3053* (2013.01); *G06F 17/3064* (2013.01); *G06F 3/048* (2013.01); *G06F 17/273* (2013.01); *G06F 17/30985* (2013.01); *H04M 2250/70* (2013.01); *G06F 17/276* (2013.01)
USPC ........... 715/261; 715/256; 715/257; 715/259; 715/271; 715/773

(58) Field of Classification Search
CPC ..... G06F 3/0237; G06F 3/048; G06F 17/273; G06F 17/276; G06F 17/3053; G06F 17/3064; G06F 17/30985; H04M 2250/70
USPC .................. 715/256, 257, 259, 261, 271, 773
See application file for complete search history.

(56) References Cited

U.S. PATENT DOCUMENTS

| | | | | | |
|---|---|---|---|---|---|
| 5,748,512 | A | * | 5/1998 | Vargas | 708/142 |
| 6,005,495 | A | * | 12/1999 | Connolly et al. | 341/22 |
| 6,487,424 | B1 | * | 11/2002 | Kraft et al. | 455/566 |
| 7,293,231 | B1 | * | 11/2007 | Gunn et al. | 345/179 |
| 7,487,145 | B1 | * | 2/2009 | Gibbs et al. | 1/1 |
| 7,836,044 | B2 | * | 11/2010 | Kamvar et al. | 707/713 |
| 8,035,618 | B2 | * | 10/2011 | Rubanovich et al. | 345/169 |
| 8,347,222 | B2 | * | 1/2013 | Raguseo | 715/780 |

(Continued)

*Primary Examiner* — Andrew Dyer
(74) *Attorney, Agent, or Firm* — Christopher P. Maiorana, PC

(57) ABSTRACT

The present invention provides a word input method including the steps of: selectively inputting one or more letters containing the first letter of the word to be inputted; extracting, as a first priority, a word having less letters than a predetermined number, and which coincides with the word to be inputted, in a sequence from the first letter, from words containing one or more letters, from a word storage unit; extracting, as a second priority, a word having less letters than the predetermined number, from words containing one or more letters, from the word storage unit; extracting, as a third priority, a word having more letters than the predetermined number, and which coincides with the word to be inputted, in a sequence from the first letter, from words containing one or more letters, from the word storage unit; extracting, as a fourth priority, a word having more letters than the predetermined number, from words containing one or more letters, from the word storage unit; dividing the words of the first priority to the fourth priority into the group having less letters than the predetermined number and the group having more letters than the predetermined number, and displaying the groups in the order of frequency on a word display window; and enabling the letters to be converted and completed into a selected word during inputting when the word is selected by a user from among the words displayed on the word display window.

3 Claims, 2 Drawing Sheets

(56) References Cited

U.S. PATENT DOCUMENTS

| | | | |
|---|---|---|---|
| 8,462,119 B2* | 6/2013 | Griffin et al. | 345/169 |
| 8,581,849 B2* | 11/2013 | Lu | 345/168 |
| 2005/0041011 A1* | 2/2005 | Silfverberg et al. | 345/156 |
| 2005/0273724 A1* | 12/2005 | Joeressen et al. | 715/773 |
| 2006/0258390 A1* | 11/2006 | Cui et al. | 455/550.1 |
| 2009/0058816 A1* | 3/2009 | Takeuchi | 345/169 |

* cited by examiner

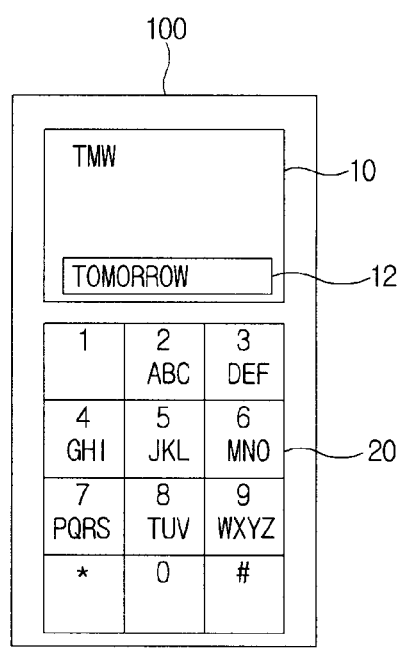

WORD INPUT METHOD

This is a continuation of International Application PCT/KR2009/004506, with an international filing date of Aug. 12, 2009, currently pending, which is hereby incorporated by reference.

BACKGROUND OF THE INVENTION

1. Field of the Invention

The present invention relates to a word input method, and more particularly to a word input method which is for use in a terminal such as a cellular phone, a touch phone, a smart phone, a PDA, an UMPC, a touch screen notebook, a PC and the like.

2. Description of Related Art

Due to a development of information and communication technology up to recently, mobile terminals have been widely supplied due to their improved portability and convenience.

Hereinafter, a prior method of inputting words will be described referring to FIG. 1. FIG. 1 is a drawing showing keypads of the mobile terminal.

As shown in FIG. 1, when the user wants to input an English word, e.g., "telecommunication", he must input "t" by pressing a number key 8 once, "e" by pressing a number key 3 twice, "l" by pressing a number key 5 three times, "e" by pressing the number key 3 twice, "c" by pressing a number key 2 three times, "o" by pressing a number key 6 three times, "m" by pressing the number key 6 once, "m" by pressing the number key 6 once, "u" by pressing a number key 8 twice, "n" by pressing the number key 6 twice, "i" by pressing a number key 4 three times, "c" by pressing a number key 2 three times, "a" by pressing the number key 2 once, "t" by pressing the number key 8 once, "i" by pressing a number key 4 three times, "o" by pressing the number key 6 three times, and "n" by pressing the number key 6 twice.

In other words, the user needs to press several keys thirty six times when he wants to input the English word "telecommunication".

As such, the prior method of inputting words has problems in that it takes much time to input the words and it is easy to press wrong keys because the keys must be pressed a larger number of times to input the words.

SUMMARY OF THE INVENTION

The present invention is contemplated to resolve the problems mentioned-above, and an object of the present invention is directed to providing a word input method which allows the words to be searched easily and quickly by inputting only partial letters of the words selectively.

One embodiment of the present invention is directed to providing a word input method including the steps of: selectively inputting one or more letters containing the first letter of the word to be inputted; extracting, as a first priority, a word having less letters than a predetermined number, and which coincides with the word to be inputted, in a sequence from the first letter, from words containing one or more letters, from a word storage unit; extracting, as a second priority, a word having less letters than the predetermined number, from words containing one or more letters, from the word storage unit; extracting, as a third priority, a word having more letters than the predetermined number, and which coincides with the word to be inputted, in a sequence from the first letter, from words containing one or more letters, from the word storage unit; extracting, as a fourth priority, a word having more letters than the predetermined number, from words containing one or more letters, from the word storage unit; dividing the words of the first priority to the fourth priority into the group having less letters than the predetermined number and the group having more letters than the predetermined number, and displaying the groups in the order of frequency on a word display window; and enabling the letters to be converted and completed into a selected word during inputting when the word is selected by a user from among the words displayed on the word display window.

Preferably, the predetermined number of letters is 6.

Further, another embodiment of the present invention provides a word input method, including the steps of: extracting only words having more than a predetermined number of letters among the words containing four consonant letters from a word storage unit if the four consonant letters of the word to be inputted are consecutively inputted, to allow them to be displayed on a word display window; and converting the unfinished four consonant letters into a selected word if the user selects the word to be inputted among the words displayed on the word display window to allow the selected word to be inputted.

According to the present invention, it is possible to quickly search the words since the user inputs only partial letters of the words without modifying the arrangement of the existing keypad.

Further, it is possible to improve the search efficiency because the words are searched by dividing them into less and more than a predetermined number of letters. Generally, there is a tendency that the words having less than 6 letters are of high frequency and the words having more than 6 letters are of low frequency. If whole words are searched based on the frequency of their occurrence according to the prior method of searching, the words including short words of high frequency are searched when a long word is searched so that the number of words searched is increased and thus the search efficiency is reduced. Meanwhile, the present invention has advantages in that the words can be searched quickly since the words are divided into less and more than a predetermined number of letters and the letters are selectively inputted, and the words can be searched even though the user does not know the partial spelling of the word.

Further, it is possible to reduce the number of times that the keys are pressed since the user can input only letters corresponding to selected keys without a need for inputting many letters arranged on 12 keys by pressing each key several times, and it is possible to improve the search efficiency since the words are divided into less and more than the predetermined number of letters.

Further, such an inputting method can be applied for English, as well as any languages all over the world.

BRIEF DESCRIPTION OF THE DRAWINGS

FIG. 1 is a drawing showing a general keypad of mobile terminal.

FIG. 2 is a front view of a mobile terminal according to one embodiment of the present invention.

DESCRIPTION OF SPECIFIC EMBODIMENTS

Figure 3:
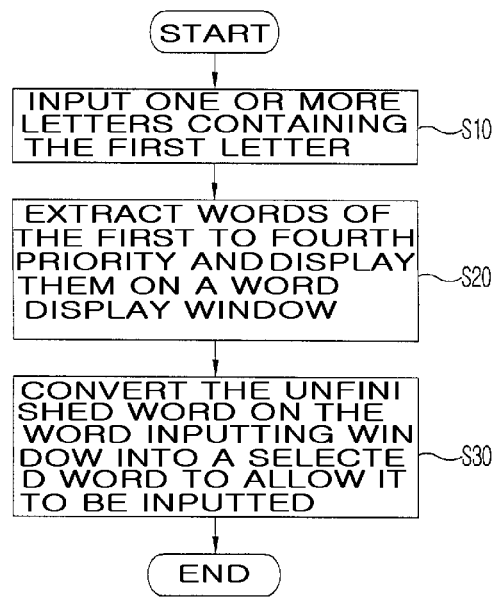
FIG. 3 is a flow diagram of a word input method according to one embodiment of the present invention.

Hereinafter, the preferable embodiment of the present invention will be described referring to accompanying drawings.

FIG. 2 is a front view of a mobile terminal according to one embodiment of the present invention.

As shown in FIG. 2, the mobile terminal 100 of the present invention includes a display unit (a word inputting window 10 and a word display window 12), a keypad 20, a word storage unit (database), and control unit (not shown).

The keypad 20 has English characters assigned to each number key to allow the user to input the English characters.

The English characters pressed by the user using the keypad 20 are displayed on the word inputting window 10.

Upon inputting the word, e.g., "tomorrow", "the, that" is displayed in the word display window 12 if "t" is inputted on the word inputting window by pressing the number key 8 once, "time, tom" is displayed in the word display window 12 if "m" is additionally inputted by pressing the number key 6 once, and "tomorrow, tomahowh, teamwork" is further displayed in the word display window 12 if "w" is further inputted by pressing the number key 9 once.

Specifically, if such a "tmw" is inputted, the control unit detects and extracts the words containing the corresponding letters from the words having less than 6 letters stored in the word storage unit with a first priority, and if there are no corresponding words, it detects and extracts the words from the words having more than 6 letters stored in the word storage unit in the next stage, to allow the extracted words to be displayed on the word display window 12.

Herein, if the user selects "tomorrow", the unfinished letters, "tmw" is converted into the selected word, "tomorrow" to allow it to be displayed as the finished word on the word inputting window 10.

FIG. 3 is a flow diagram of the word input method according to one embodiment of the present invention.

First, one or more letters containing the first letter of the word (for example, English word) which the user wants to input is inputted S10.

Then, the words having less than a predetermined number of letters (for example, 6 letters) which matches in order from the first letter of the words containing the one or more letters are extracted with a first priority, the words having less than a predetermined number of letters among the words containing the one or more letters are extracted with a second priority, the words having more than a predetermined number of letters which matches in order from the first letter of the words containing the one or more letters are extracted with a third priority, and then the words having more than a predetermined number of letters among the words containing the one or more letters are extracted with a fourth priority, to make the words of the first to fourth priorities to be displayed on the word display window 12 in order S20.

At last, if the word which the user wants to input is selected among the words displayed on the word display window 12, the unfinished one or more letters are converted into the selected word to allow it to be displayed on the word inputting window 10 S30.

Herein, the one or more letters containing the first letter may be an English consonant.

It will be specifically described as follows:

For example, if two letters, "ma" are inputted, the words having the order consistent with that of the letters among the words having less than 6 letters are extracted from the word storage unit with a first priority so that "man, make" may be displayed.

Further, if "tk" is inputted, the words having less than 6 letters containing "tk" are extracted from the word storage unit so that "think, take, took" may be displayed.

Further, if four consecutive consonants, "tkgg" are inputted, the word having more than 6 letters are searched so that a word of "thanksgiving" may be displayed.

In such a manner, since the user can input "typewriter" with four consonants "tpwt", he may press four keys on the keypad only once respectively.

Further, the user may input the word "misunderstand" by pressing each key corresponding to "mdtd" or "mdtad" only once or by pressing each key corresponding to five consonants "msdtd".

Further, the English word "telecommunication" may be inputted by pressing four keys corresponding to consonants "tcmt" six times or four keys corresponding to consonants "teun" seven times.

Such a method of inputting words can be applied for Chinese.

According to prior art, "中華民國" can be inputted by pressing the number keys 42321 221 132 123 corresponding to "zhong hua min guo" total 29 times.

Meanwhile, "中華民國" can be inputted using manners such as six examples according to the present invention as follows:

Ex 1) It can be inputted by pressing each of five number keys corresponding to "zg a m g" once;

Ex 2) It can be inputted by inputting the number keys corresponding to "zn m guo" without inputting a pronunciation symbol of 華 (hua);

Ex 3) It can be inputted by inputting the number keys corresponding to "zhg hu gu" without inputting a pronunciation symbol of 民 (min);

Ex 4) It can be inputted by pressing the number keys corresponding to only consonants of "zhng h mn g";

Ex 5) It can be inputted by pressing the number keys corresponding to only vowels of zo ua i uo; and Ex 6) It can be inputted by pressing the number keys corresponding to only partial pronunciation of "zh ha n guo".

As such, the user can selectively input the letters consisting of only consonants of low frequency, exclusive of vowels of high frequency and further can select to input only the letters of which the key is pressed a lower number of times. Further, the word can be searched even though the user inputs only a few letters in a case he dose not know a perfect spelling of the word. Further, since the words are searched depending on the frequency of their occurrence by dividing them into less and more than a predetermined number of letters, the word search is quickly performed.

While the present invention has been described with respect to the specific embodiments, it will be apparent to those skilled in the art that various changes and modifications may be made without departing from the spirit and scope of the invention as defined in the following claims.

What is claimed is:

1. A word input method, including the steps of:

having a word storage unit wherein words having less letters than a predetermined number and words having more letters than the predetermined number are divided;

selectively and sequentially inputting one or more letters containing the first letter of the word to be inputted;

extracting a first word from the word storage unit of words having less letters than a predetermined number, wherein the first word coincides with the input one or more letters in a sequence from the first letter;

extracting a second word from the word storage unit of words having less letters than the predetermined number, wherein the second word corresponds with the input one or more letters at least partially comprising the first letter;

extracting a third word from the word storage unit of words having more letters than the predetermined number, wherein the third word coincides with the input one or more letters in a sequence from the first letter;

extracting a fourth word from the word storage unit of words having more letters than the predetermined number, wherein the fourth word corresponds with the input one or more letters at least partially comprising the first letter;

dividing the first, second, third, and fourth words into a first group having less letters than the predetermined number and a second group having more letters than the predetermined number;

calculating a frequency for each of the first, second, third, and fourth words;

displaying, on a word display window, the first and second groups, wherein the words in each of the first and second groups are in the order of the frequency;

receiving a selection of a word from among the words displayed on the display window; and enabling the letters to be converted and completed into a selected word during inputting when the word is selected by a user from among the words displayed on the word display window.

2. The word input method according to claim 1, wherein the predetermined number of letters is 6.

3. The word input method according to claim 1, further including the steps of:

selectively and sequentially skipping letters except the first letter of the word being input;

extracting only words having more than the predetermined number among the words containing four consonant letters from a word storage unit if the four consonant letters of the word to be entered are consecutively entered, to allow them to be displayed on the word display window, wherein the words corresponds with the selectively input one or more letters at least partially including the first letter; and converting the unfinished four consonant letters into a selected word if the user selects the word to be entered among the words displayed on the word display window to allow the selected word to be entered.

* * * * *